United States Patent
Matsumoto et al.

(10) Patent No.: US 9,869,482 B2
(45) Date of Patent: Jan. 16, 2018

(54) VENTILATION SYSTEM, VENTILATION METHOD, VENTILATION CONTROL DEVICE, AND NON-TRANSITORY COMPUTER-READABLE RECORDING MEDIUM

(71) Applicant: Mitsubishi Electric Corporation, Tokyo (JP)

(72) Inventors: Takashi Matsumoto, Tokyo (JP); Hirotoshi Yano, Tokyo (JP); Toshiaki Yoshikawa, Tokyo (JP); Komi Matsubara, Tokyo (JP); Masami Hagiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 338 days.

(21) Appl. No.: 14/044,096

(22) Filed: Oct. 2, 2013

(65) Prior Publication Data
US 2014/0099872 A1    Apr. 10, 2014

(30) Foreign Application Priority Data

Oct. 5, 2012    (JP) ................................. 2012-222813

(51) Int. Cl.
*F24F 11/00*    (2006.01)
*F24F 7/013*    (2006.01)
(Continued)

(52) U.S. Cl.
CPC .......... *F24F 11/0017* (2013.01); *F24F 7/013* (2013.01); *F24F 11/0001* (2013.01);
(Continued)

(58) Field of Classification Search
CPC ..................................................... F24F 11/00
(Continued)

(56) References Cited

U.S. PATENT DOCUMENTS

| 2,877,834 | A | * | 3/1959 | Campbell | ................. | F23L 3/00 |
| | | | | | | 126/307 R |
| 5,205,783 | A | * | 4/1993 | Dieckert | .................. | F24F 7/08 |
| | | | | | | 454/238 |

(Continued)

FOREIGN PATENT DOCUMENTS

JP    S57-100131 U    6/1982
JP    S61-15465 Y2    5/1986

(Continued)

OTHER PUBLICATIONS

Office Action dated Oct. 26, 2015 in the corresponding CN application No. 201310453228.1 (with partial English translation attached.

(Continued)

*Primary Examiner* — Steven B McAllister
*Assistant Examiner* — Samantha Miller
(74) *Attorney, Agent, or Firm* — Posz Law Group, PLC

(57) ABSTRACT

The ventilation system is a system for ventilating a building and comprises an air supplier/exhauster comprising air supply function and exhaust function and a ventilation control device controlling the operation of the air supplier/exhauster. Upon operating the air supplier/exhauster, the ventilation control device determines which the air supplier/exhauster conducts, air supply operation or exhaust operation, based on wind information regarding the outdoor wind. The ventilation through the ventilation passage from the air supplier/exhauster to a vent provided in the building is conducted when the air supplier/exhauster conducts air supply operation. Alternatively, the ventilation through the ventilation passage from the vent to the air supplier/exhauster is conducted when the air supplier/exhauster conducts exhaust operation.

12 Claims, 7 Drawing Sheets

(51) Int. Cl.
   *F24F 11/04* (2006.01)
   *F24F 7/00* (2006.01)
(52) U.S. Cl.
   CPC ........ *F24F 11/001* (2013.01); *F24F 11/0076* (2013.01); *F24F 11/043* (2013.01); *F24F 2007/003* (2013.01); *F24F 2011/0004* (2013.01); *F24F 2011/0005* (2013.01)
(58) Field of Classification Search
   USPC ........................................................ 454/229
   See application file for complete search history.

(56) References Cited

U.S. PATENT DOCUMENTS

| | | | | |
|---|---|---|---|---|
| 6,126,540 | A * | 10/2000 | Janu .................. | F24F 11/04 165/249 |
| 7,226,496 | B2 * | 6/2007 | Ehlers .................................. | 95/2 |
| 8,726,586 | B1 * | 5/2014 | Stevens et al. .............. | 52/173.1 |
| 2005/0000231 | A1 * | 1/2005 | Lee .................... | A41D 13/0025 62/3.5 |
| 2006/0058900 | A1 * | 3/2006 | Johanson ............... | G05B 15/02 700/83 |
| 2008/0113612 | A1 * | 5/2008 | Chich et al. ................... | 454/341 |
| 2008/0146135 | A1 * | 6/2008 | Hein et al. ...................... | 454/68 |
| 2008/0242218 | A1 * | 10/2008 | Asano et al. .................. | 454/338 |
| 2011/0108368 | A1 * | 5/2011 | Yamamoto ............... | B66B 1/30 187/293 |
| 2011/0111689 | A1 * | 5/2011 | Takeuchi ............. | F24F 11/0001 454/239 |
| 2011/0151766 | A1 * | 6/2011 | Sherman ................. | F24F 7/007 454/239 |
| 2012/0122388 | A1 * | 5/2012 | Matsui ..................... | F24F 7/08 454/251 |
| 2012/0149291 | A1 * | 6/2012 | Roderick et al. ............. | 454/251 |
| 2012/0247748 | A1 | 10/2012 | Mise et al. | |
| 2014/0305141 | A1 * | 10/2014 | Anandhakrishnan ... | F25B 21/02 62/3.2 |

FOREIGN PATENT DOCUMENTS

| | | |
|---|---|---|
| JP | H05-044969 A | 2/1993 |
| JP | H07-293954 A | 11/1995 |
| JP | 2005-337647 A | 12/2005 |
| JP | 2010-091237 A | 4/2010 |
| JP | 2011-058753 A | 3/2011 |

OTHER PUBLICATIONS

Office Action dated Dec. 27, 2016 issued in corresponding CN patent application No. 201310453228.1(and English translation).
Chinese Office Action dated Jun. 3, 2016 in the corresponding CN application No. 201310453228.1(English translatio attached).
Office Action dated Nov. 18, 2014 issued in corresponding JP patent application No. 2012-222813 (and English translation).

* cited by examiner

VENTILATION SYSTEM, VENTILATION METHOD, VENTILATION CONTROL DEVICE, AND NON-TRANSITORY COMPUTER-READABLE RECORDING MEDIUM

CROSS-REFERENCE TO RELATED APPLICATION

This application claims the benefit of Japanese Patent Application No. 2012-222813, filed on Oct. 5, 2012, the entire disclosure of which is incorporated by reference herein.

FIELD

This application relates to a technique for ventilation of a living space.

BACKGROUND

Recently, from the viewpoint of energy saving, high-density housing has been increasing for preventing energy loss. On the other hand, for improved performance of air-conditioning apparatus and/or for security reasons, keeping the windows closed virtually at all times has become a common lifestyle choice.

The above living conditions contribute to occurrence of so-called house dust and thus air contamination in the living space becomes an issue. Furthermore, there is a risk of chemicals such as formaldehyde being released from building material and furniture and staying in the living space, which causes the occupants impaired health.

In view of the above problems, in Japan, the revised Building Standard Law, effected as of Jul. 1, 2003, requires a new or renovated building to have 24-hour ventilation equipment, more specifically equipment capable of ventilation 0.5 times/h or more often.

As a ventilation technique in conformity to the above law, for example, Patent Literature 1 (Unexamined Japanese Patent Application Kokai Publication No. 2005-337647) discloses a house equipment control device (home server) controlling an air-conditioning apparatus and/or ventilation equipment having the function of air-purification installed in a living space and ventilating the living space. This home server is connected to a sensor detecting chemicals and the like and as the sensor detects sick building substances, orders the air-conditioning apparatus or the like to conduct ventilation. Furthermore, this home server orders the air-conditioning apparatus or the like to conduct ventilation every two hours (0.5 times/h) even if the sensor detects no sick building substances.

In comparison with manual operation by the occupants, automatic ventilation of the living space at least every two hours such as the technique described in the Patent Literature 1 causes the ventilation apparatus such as ventilation fans to operate more frequently and increases the power consumption. Then, efficient ventilation is required as an energy saving measure. The Patent Literature 1 has no description of efficient ventilation. Thus, actually, there is a demand for a new technique for efficient ventilation of a living space.

SUMMARY

The present invention is invented in view of the above circumstances and an exemplary objective of the present invention is to provide a ventilation system, a ventilation method, a ventilation control device, and a non-transitory computer-readable recording medium storing a program realizing efficient ventilation of a living space.

In order to achieve the above objective, the ventilation system according to the present invention is a ventilation system for ventilating a building, comprising:

an air supplier/exhauster comprising air supply function and exhaust function; and a ventilation control device controlling the operation of the air supplier/exhauster, wherein upon operating the air supplier/exhauster, the ventilation control device determines which the air supplier/exhauster conducts, air supply operation or exhaust operation, based on wind information regarding the outdoor wind, and the ventilation through the ventilation passage from the air supplier/exhauster to a vent provided to the building is conducted when the air supplier/exhauster conducts air supply operation and alternatively, the ventilation through the ventilation passage from the vent to the air supplier/exhauster is conducted when the air supplier/exhauster conducts exhaust operation.

The ventilation system according to another aspect of the present invention is a ventilation system for ventilating a building, comprising:

a first air supplier/exhauster comprising air supply function and exhaust function;

a second air supplier/exhauster comprising air supply function and exhaust function; and a ventilation control device controlling the operation of the first air supplier/exhauster and second air supplier/exhauster, wherein upon operating the first air supplier/exhauster and second air supplier/exhauster, the ventilation control device determines which the first air supplier/exhauster and second air supplier/exhauster conduct, air supply operation or exhaust operation, based on wind information regarding the outdoor wind, and the ventilation control device orders the second air supplier/exhauster to conduct exhaust operation when ordering the first air supplier/exhauster to conduct air supply operation and alternatively, orders the second air supplier/exhauster to conduct air supply operation when ordering the first air supplier/exhauster to conduct exhaust operation.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present invention will be described hereafter with reference to the drawings.

Embodiment 1

Figure 1:
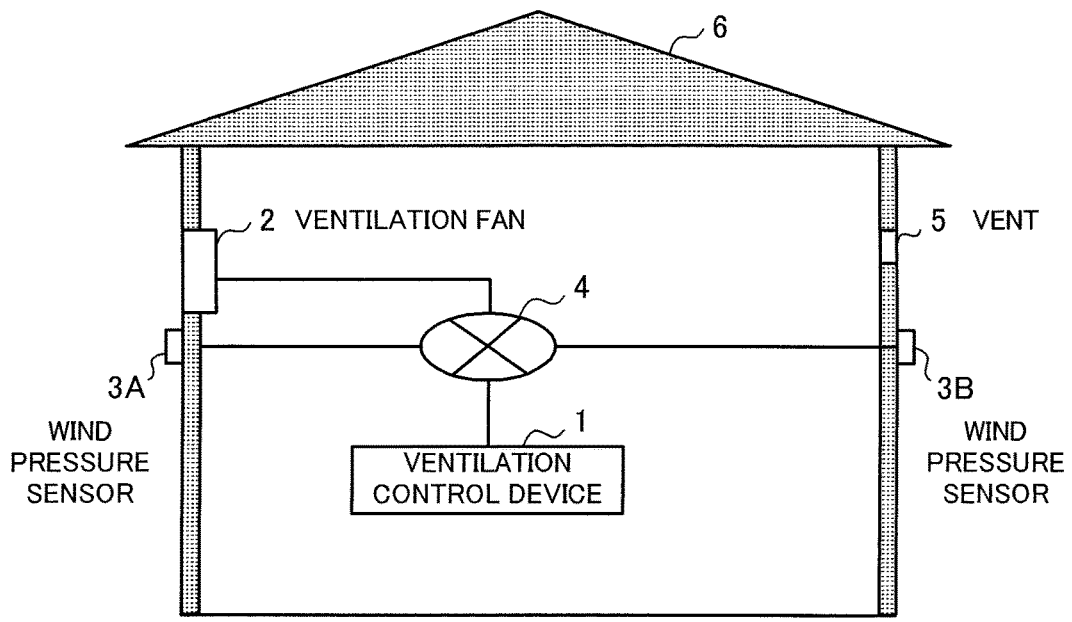
FIG. 1 is an illustration showing an entire configuration of a ventilation system according to Embodiment 1 of the present invention.

FIG. 1 is an illustration showing an entire configuration of a ventilation system according to Embodiment 1 of the present invention. This ventilation system is a system for ventilating a building (here, the living space of a house 6). This ventilation system comprises a ventilation control device 1, a ventilation fan 2, and wind pressure sensors 3A and 3B.

The ventilation fan 2 (a specific example of the air supplier/exhauster) is installed at a proper position on an exterior wall of the house 6. The ventilation fan 2 comprises a propeller fan, a motor, a motor drive circuit, a shutter, a communication circuit, and the like (none of these are shown) in a rectangular enclosure. The communication circuit is connected to a home network 4 established within the house 6 in a wired or wireless communication executable manner. The home network 4 is a network complying, for example, with ECHONET.

The motor drive circuit drives the motor based on control data the communication circuit receives from the ventilation control device 1. Then, the motor rotates the propeller fan connected via the rotation shaft forward or backward. As the propeller fan rotates forward, the outdoor air is taken into the living space via the ventilation fan 2 (namely, air supply). As the propeller fan rotates backward, the air in the living space is discharged to the outdoor (namely, exhaust).

The shutter is opened/closed based on control data the communication circuit receives from the ventilation control device 1. More specifically, the shutter is opened when the control data from the ventilation control device 1 suggest the start of rotation of the motor, and closed when the control data suggest the stop of rotation of the motor. As the shutter is opened, the air passage between the living space and the outdoor via the ventilation fan 2 is opened up. On the other hand, as the shutter is closed, the air passage between the living space and the outdoor via the ventilation fan 2 is closed off.

The wind pressure sensors 3A and 3B (each a specific example of the wind information measurer) measure the outdoor wind pressure and are installed at proper positions on the outer side of exterior walls of the house 6. The wind pressure sensors 3A and 3B are connected to the home network 4 and each transmit data including the measurement results (wind pressure data) to the ventilation control device 1 via the home network 4 in a predetermined timely manner The wind pressure sensor 3A is installed near the ventilation fan 2 and the wind pressure sensor 3B is installed near a vent 5, which is described later.

The vent 5 is provided at a proper position on an exterior wall of the house 6 and used as a vent hole for the air to pass through while the ventilation fan 2 is in operation. In other words, the air in the living space is discharged to the outdoor via the vent 5 while the ventilation fan 2 supplies the air. On the other hand, the outdoor air is taken into the living space via the vent 5 while the ventilation fan 2 exhausts the air.

In this embodiment, the vent 5 is provided at a proper position on the exterior wall opposite to the exterior wall on which the ventilation fan 2 is installed. The vent 5 is provided with a not-shown filter for preventing insects, dust, pollen, and the like from entering the living space.

Figure 2:
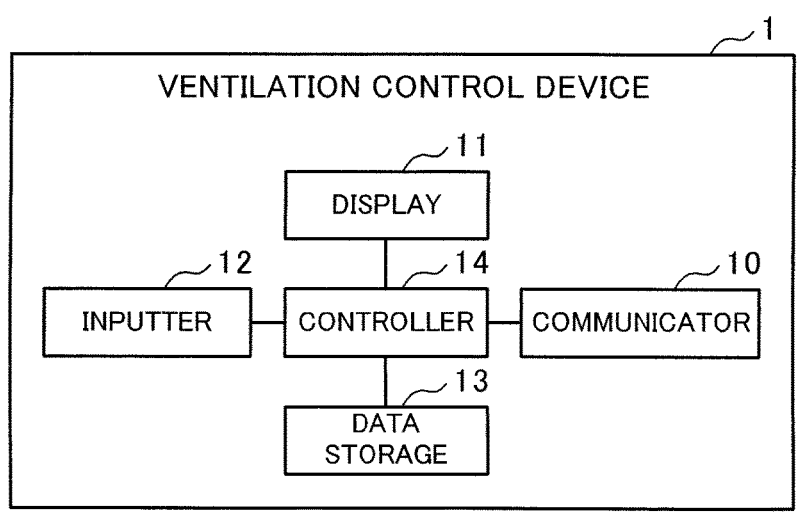
FIG. 2 is a block diagram showing a configuration of a ventilation control device according to Embodiment 1.

The ventilation control device 1 is installed at a proper place within the house 6 and comprises, as shown in FIG. 2, a communicator 10, a display 11, an inputter 12, a data storage 13, and a controller 14.

The communicator 10 is configured to include a communication interface such as a LAN card and connected to the home network 4 in a wired or wireless communication executable manner to conduct data communication with the ventilation fan 2 and wind pressure sensors 3A and 3B via the home network 4 under the control of the controller 14.

The display 11 is configured to include a liquid crystal display and displays screens presenting the operation state of the ventilation fan 2, screens presenting the measurement results of the wind pressure sensors 3A and 3B, and various screens for user operation under the control of the controller 14. The inputter 12 is configured to include a touch panel, a touch pad and/or the like and receives input of operation from the user.

The data storage 13 plays a role of a so-called secondary storage (auxiliary storage) and is configured with a nonvolatile readable/writable semiconductor memory or the like such as a flash memory. The data storage 13 stores programs, data and the like for controlling the ventilation fan 2.

Figure 3:
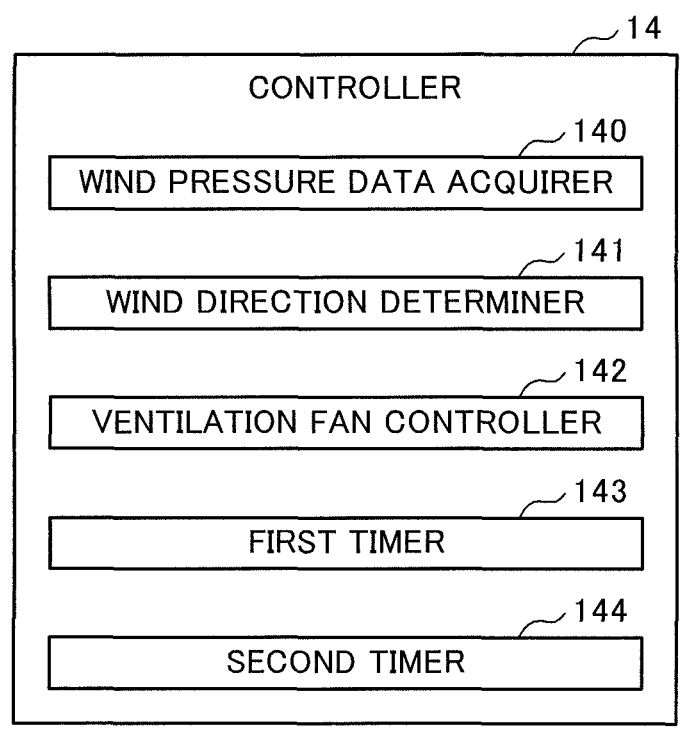
FIG. 3 is a block diagram showing a functional configuration of a controller of the ventilation control device according to Embodiment 1.

The controller 14 is configured to include a CPU (central processing unit), a ROM (read only memory), and a RAM (random access memory) (none of these is shown) and controls the entire ventilation control device 1. The controller 14 functionally comprises, as shown in FIG. 3, a wind pressure data acquirer 140, a wind direction determiner 141, a ventilation fan controller 142, a first timer 143, and a second timer 144. The functions of these components are realized by the CPU and the like running the above-mentioned programs stored in the data storage 13.

The wind pressure data acquirer 140 (a specific example of the wind information acquirer) acquires wind pressure data from the wind pressure sensors 3A and 3B in a predetermined timely manner. In this embodiment, the wind pressure data acquirer 140 requests the wind pressure sensors 3A and 3B to transmit wind pressure data at predetermined time intervals (for example, two hours) since the most recent start of ventilation. In response, the wind pressure sensors 3A and 3B each transmit wind pressure data. As the communicator 10 receives the wind pressure data, the wind pressure data acquirer 140 supplies the wind pressure data received from the wind pressure sensors 3A and 3B to the wind direction determiner 141.

The wind direction determiner 141 compares the measurement result contained windward pressure data from the wind pressure sensor 3A with the measurement result contained windward pressure data from the wind pressure sensor 3B and determines the wind direction of the outdoor air. In other words, the wind direction determiner 141 compares the wind pressure measured by the wind pressure sensor 3A with the wind pressure measured by the wind pressure sensor 3B. Then, the wind direction determiner 141 determines that the installation point of the wind pressure sensor that has measured the higher wind pressure is windward and the installation point of the wind pressure sensor that has measured the lower wind pressure is leeward. Because the wind pressure sensor 3A is installed near the ventilation fan 2 and the wind pressure sensor 3B is installed near the vent 5, this allows the wind direction determiner 141 to determine the installation point of which of the ventilation fan 2 and vent 5 is windward and the installation point of which of the ventilation fan 2 and vent 5 is leeward. The wind direction determiner 141 notifies the ventilation fan controller 142 of the determination result.

The ventilation fan controller 142 (a specific example of the air supply/exhaust controller) controls the ventilation fan 2 based on the determination result notified from the wind direction determiner 141. More specifically, if the installation point of the wind pressure sensor 3A is determined to be windward, the ventilation fan controller 142 controls the ventilation fan 2 to rotate the propeller fan forward. On the other hand, if the installation point of the wind pressure sensor 3A is determined to be leeward, the ventilation fan controller 142 controls the ventilation fan 2 to rotate the propeller fan backward.

The first timer 143 is a timer triggering the start of ventilation. The first timer 143 starts timing as the ventilation starts. Then, reaching a predetermined time (for example, two hours), the first timer 143 calls a timeout and triggers an event accordingly.

The second timer 144 is a timer triggering the end of ventilation. The second timer 144 starts timing as the ventilation starts. Then, reaching a predetermined time (for example, 10 minutes), the second timer 144 calls a timeout and triggers an event accordingly.

Figure 4:
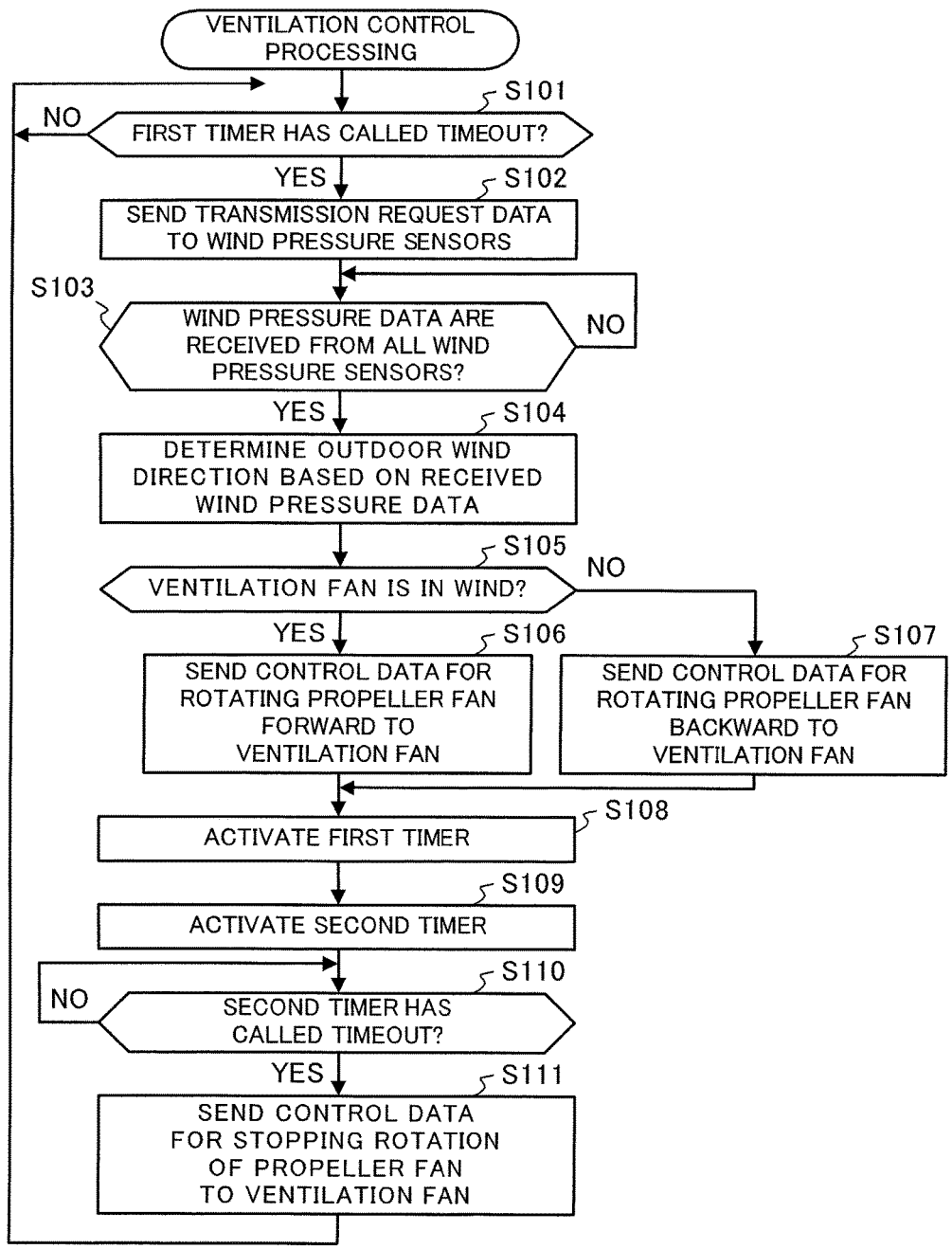
FIG. 4 is a flowchart showing a proceeding of a ventilation control processing according to Embodiment 1.

FIG. 4 is a flowchart showing a proceeding of a ventilation control processing executed by the controller 14 of the ventilation control device 1 having the above configuration. The ventilation control processing is repeatedly executed while the ventilation control device 1 is in the power-on state.

The wind pressure data acquirer 140 checks whether the first timer 143 has called a timeout (Step S101). If the first timer 143 has called a timeout (Step S101: YES), the wind pressure data acquirer 140 sends data requesting for transmission of the measurement results (transmission request data) to the wind pressure sensors 3A and 3B via the communicator 10 (Step S102). Receiving the transmission request data, the wind pressure sensors 3A and 3B each transmit wind pressure data in which the measurement results are stored to the ventilation control device 1.

As the communicator 10 receives the wind pressure data transmitted from the wind pressure sensors 3A and 3B (Step S103; YES), the wind direction determiner 141 compares the measurement results (namely, the wind pressures) contained in the wind pressure data of the wind pressure sensors 3A and 3B and determines the wind direction as described above (Step S104). The wind direction determiner 141 notifies the ventilation fan controller 142 of the determination result.

If the wind direction determiner 141 determines that the installation point of the wind pressure sensor 3A is windward, namely the ventilation fan 2 is windward (Step S105; YES), the ventilation fan controller 142 creates control data for rotating the propeller fan of the ventilation fan 2 forward and sends the created control data to the ventilation fan 2 via the communicator 10 (Step S106). Receiving the control data, the ventilation fan 2 rotates the propeller fan forward. Consequently, the air is supplied through the ventilation fan 2 and the air in the living space is discharged through the vent 5. In this way, the ventilation of the living space of the house 6 through the ventilation passage from the ventilation fan 2 to the vent 5 starts.

On the other hand, if the wind direction determiner 141 determines that the installation point of the wind pressure sensor 3A is leeward, namely the ventilation fan 2 is leeward (Step S105; NO), the ventilation fan controller 142 creates control data for rotating the propeller fan of the ventilation fan 2 backward and sends the created control data to the ventilation fan 2 via the communicator 10 (Step S107). Receiving the control data, the ventilation fan 2 rotates the propeller fan backward. Consequently, the air in the living space is discharged through the ventilation fan 2 and the outdoor air is supplied through the vent 5. In this way, the ventilation of the living space through the ventilation passage from the vent 5 to the ventilation fan 2 starts.

In sync with the transmission of the control data, the ventilation fan controller 142 activates the first timer 143 (Step S108) and further activates the second timer 144 (Step S109). Then, as the second timer 144 has called a timeout (Step S110; YES), the ventilation fan controller 142 creates control data for stopping the rotation of the propeller fan of the ventilation fan 2 and sends the created control data to the ventilation fan 2 via the communicator 10 (Step S111). Receiving the control data, the ventilation fan 2 stops the rotation of the propeller fan. Consequently, the ventilation of the living space of the house 6 ends. After the processing in the Step S111, the controller 14 returns to the processing in the Step S101.

As described above, upon ventilating the living space, the ventilation system according to Embodiment 1 of the present invention determines whether the position of the ventilation fan 2 is windward or leeward in regard to the positional relationship to the vent 5. Then, if the ventilation fan 2 is situated windward, ventilation with the airflow (ventilation passage) from the ventilation fan 2 to the vent 5 is conducted. Conversely, if the ventilation fan 2 is situated leeward, ventilation through the ventilation passage from the vent 5 to the ventilation fan 2 is conducted.

Since the ventilation is conducted using the wind direction of the outdoor air as described above, the ventilating air runs smoothly and the ventilation efficiency is improved. Consequently, it is possible to lower the performance of the ventilation fan 2, namely reduce the rotation speed of the propeller fan compared with the prior art. Alternatively, it is possible to reduce the operation time of the ventilation fan 2, namely the rotation time of the propeller fan compared with the prior art. Consequently, the power consumption can be reduced for energy saving effect.

Here, the ventilation control device 1 and ventilation fan 2 and the ventilation control device 1 and wind pressure sensors 3A and 3B may be connected by separate, dedicated communication lines, respectively, instead of the home network 4.

Furthermore, the wind pressure sensors 3A and 3B may transmit the wind pressure data voluntarily. In such a case, the wind pressure sensors 3A and 3B transmit the wind pressure data to the ventilation control device 1, for example, at one minute intervals. The ventilation control device 1 uses the first wind pressure data transmitted from the wind pressure sensors 3A and 3B after the first timer 143 has called a timeout to determine the wind direction in the above-described ventilation control processing.

Furthermore, needless to say, the ventilation control device 1 may control the ventilation fan 2 according to operation by the user via the inputter 12 in addition to the above-described automated ventilation control operation.

Figure 5:
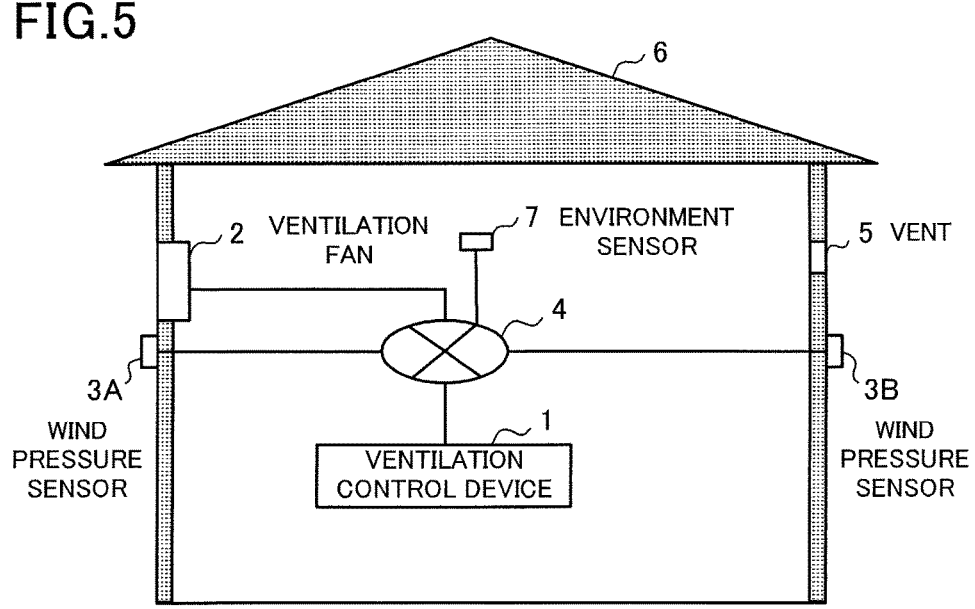
FIG. 5 is an illustration showing an entire configuration of a ventilation system according to Modification 1 of Embodiment 1.

Furthermore, as shown in FIG. 5, the ventilation system of this embodiment may additionally comprise an environment sensor 7 measuring a predetermined physical quantity indicating the air condition. The environment sensor 7 is, for example, a temperature sensor, humidity sensor, VOC (volatile organic compounds) sensor, air contamination sensor, or the like. The environment sensor 7 is installed in the living space and communicably connected to the ventilation control device 1 via the home network 4. The environment sensor 7 notifies the ventilation control device 1 of the measurement result. The ventilation control device 1 may execute the ventilation control in the event that the measurement result notified from the environment sensor 7 exceed a preset threshold in addition to the above-described routine execution. Here, the ventilation control device 1 and environment sensor 7 may be connected via a dedicated communication line.

Furthermore, the performance and/or operation time of the ventilation fan 2 may be adjusted in accordance with the outdoor wind force. The magnitude of the outdoor wind force is determined, for example, based on the absolute value of the difference between the wind pressure sensors 3A and 3B. In this way, for example in the case of a strong wind force, the performance or operation time of the ventilation fan 2 can be reduced compared with the regular operation; then, further saving of power consumption can be expected.

Figure 6:
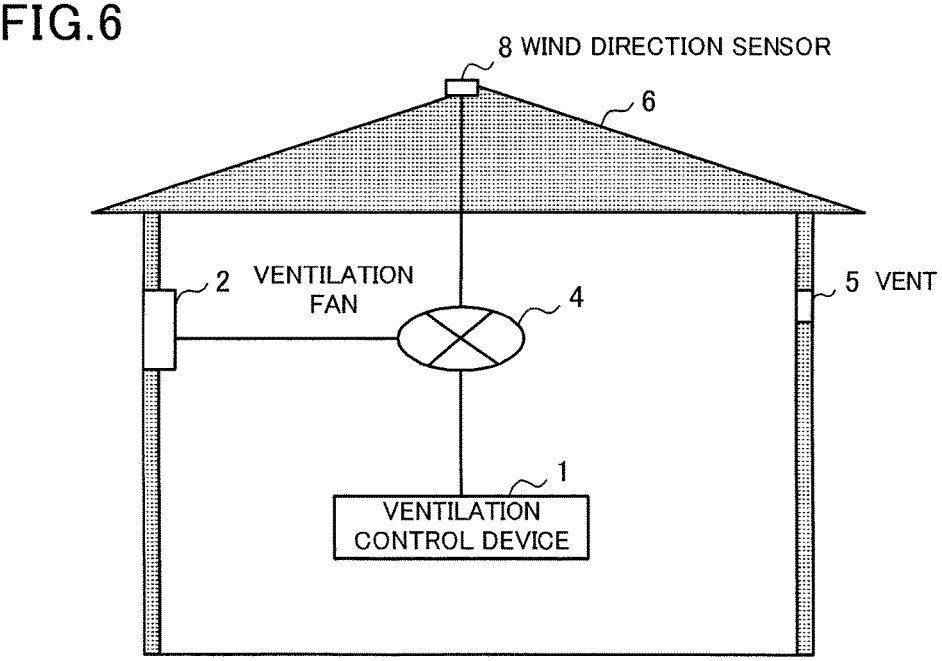
FIG. 6 is an illustration showing an entire configuration of a ventilation system according to Modification 2 of Embodiment 1.

Furthermore, as shown in FIG. 6, the ventilation system of this embodiment may comprise a wind direction sensor 8 as the wind information measurer in place of the wind pressure sensors 3A and 3B. The wind direction sensor 8 is installed at a proper place on the house 6 (for example, on the roof) and communicably connected to the ventilation control device 1 via the home network 4. The ventilation control device 1 may execute the ventilation control based on the measurement result (namely, wind information) of the wind direction sensor 8.

In the above case, more specifically, the data storage 13 of the ventilation control device 1 stores information about the house 6 regarding the direction of the place where the ventilation fan 2 is installed and the direction of the place where the vent 5 is provided in advance. Then, the wind direction determiner 141 of the controller 14 determines whether the installation point of the ventilation fan 2 is windward or leeward based on the measurement result of the wind direction sensor 8 and the above information stored in the data storage 13. Here, the ventilation control device 1 and wind direction sensor 8 may be connected by a dedicated communication line.

Embodiment 2

The ventilation system according to Embodiment 2 of the present invention will be described hereafter. In the following explanation, the same components as those in Embodiment 1 are referred to by the same reference numbers and their explanation will be omitted.

Figure 7:
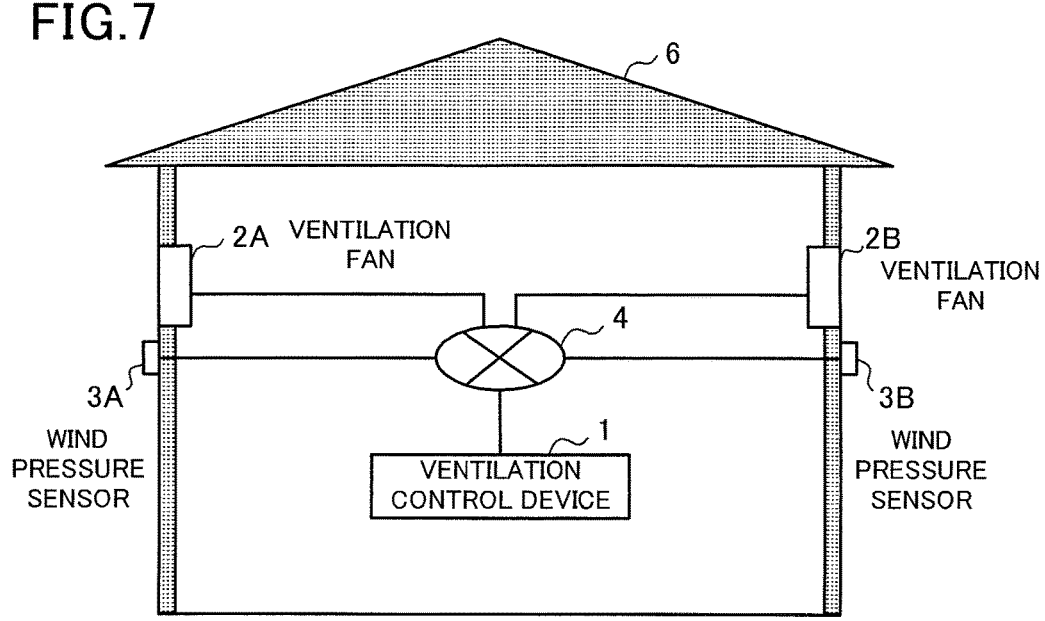
FIG. 7 is an illustration showing an entire configuration of a ventilation system according to Embodiment 2 of the present invention.

FIG. 7 is an illustration showing the entire configuration of the ventilation system according to Embodiment 2 of the present invention. This ventilation system comprises the ventilation control device 1, ventilation fans 2A and 2B (a first air supplier/exhauster and a second air supplier/exhauster), and wind pressure sensors 3A and 3B.

The ventilation system of Embodiment 1 utilizes the ventilation passage between the ventilation fan 2 and vent 5 for ventilating a living space. On the other hand, the ventilation system of Embodiment 2 utilizes the ventilation passage between two ventilation fans 2A and 2B for ventilation. In doing so, the ventilation control device 1 of this embodiment controls the windward ventilation fan 2 to rotate its propeller fan forward for air supply operation as in Embodiment 1. Furthermore, in this embodiment, the ventilation control device 1 controls the leeward ventilation fan 2 is to rotate its propeller fan backward for exhaust operation.

As described above, the ventilation system of this embodiment utilizes the ventilation fans 2A and 2B for ventilation and thus is capable of efficient ventilation.

Here, the ventilation control device 1 and ventilation fans 2A and 2B and the ventilation control device 1 and wind pressure sensors 3A and 3B can be connected by separate, dedicated communication lines, respectively, instead of the home network 4.

Embodiment 3

The ventilation system according to Embodiment 3 of the present invention will be described hereafter. In the following explanation, the same components as those in Embodiment 1 are referred to by the same reference numbers and their explanation will be omitted.

Figure 8:
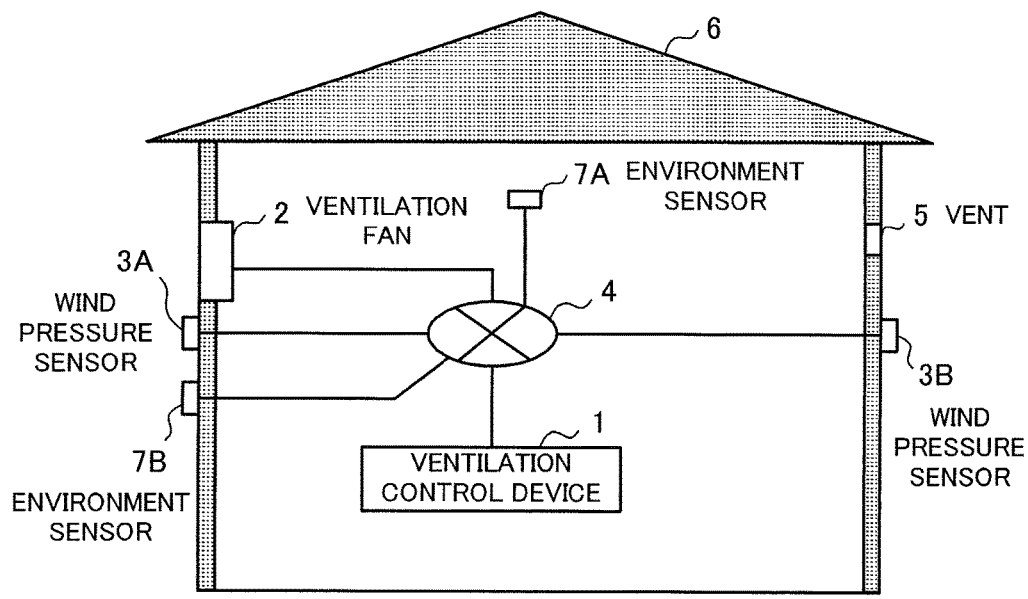
FIG. 8 is an illustration showing an entire configuration of a ventilation system according to Embodiment 3 of the present invention.

FIG. 8 is an illustration showing the entire configuration of the ventilation system according to Embodiment 3 of the present invention. This ventilation system comprises the ventilation control device 1, the ventilation fan 2, wind pressure sensors 3A and 3B, and environment sensors 7A and 7B.

The environment sensors 7A and 7B are sensors measuring a predetermined physical quantity (for example, humidity, dust concentration, or the like) and are communicably connected to the ventilation control device 1 via the home network 4. The environment sensor 7A (a specific example of the first environment sensor) is installed at a proper place within the living space and the environment sensor 7B (a specific example of the second environment sensor) is installed at a proper position on the outer side of an exterior wall of the house 6 (for example, near the wind pressure sensor 3A). The environment sensors 7A and 7B send environmental data in which their respective measurement results are contained to the ventilation control device 1 via the home network 4 in a predetermined timely manner In Embodiment 1, the ventilation control device 1 controls the ventilation fan 2 to ventilate the living space each time the first timer 143 has called a timeout, namely each time a predetermined time period (for example, two hours) has elapsed since the most recent start of ventilation in the ventilation control processing (see FIG. 4). On the other hand, in Embodiment 3, the ventilation control device 1 first determines whether it is appropriate to conduct the ventilation based on the measurement results of the environment sensors 7A and 7B in the ventilation control processing. Then, only if it is appropriate, the ventilation control device 1 executes the ventilation control.

Figure 9:
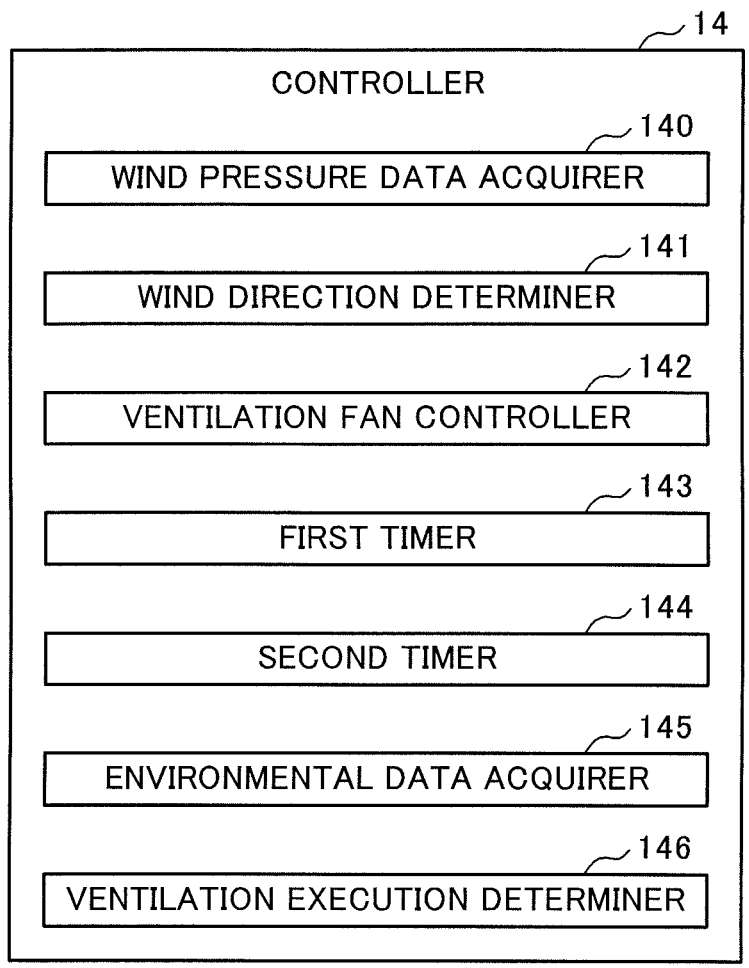
FIG. 9 is a block diagram showing a functional configuration of a controller of a ventilation control device according to Embodiment 3.

The controller 14 of the ventilation control device 1 of this embodiment further comprises, as shown in FIG. 9, an environmental data acquirer 145 and a ventilation execution determiner 146 in addition to the function of the controller 14 of Embodiment 1.

The environmental data acquirer 145 acquires environmental data from the environment sensors 7A and 7B in a predetermined timely manner. In this embodiment, the environmental data acquirer 145 requests the environment sensors 7A and 7B to transmit environmental data each time the first timer 143 has called a timeout. In response, the environment sensors 7A and 7B each transmit environmental data. As the communicator 10 receives the environmental data, the environmental data acquirer 145 supplies the environmental data received from the environment sensors 7A and 7B to the ventilation execution determiner 146.

The ventilation execution determiner 146 determines whether it is appropriate to conduct the ventilation based on the measurement results (measurements) presented by the environmental data of the environment sensors 7A and 7B. More specifically, for example, in the case of the environment sensors 7A and 7B measuring the humidity, the ventilation execution determiner 146 determines that it is not appropriate to conduct the ventilation when the measurement taken by the environment sensor 7B is higher than the measurement taken by the environment sensor 7A, namely when the outdoor humidity is higher than the humidity in the living space. Alternatively, in the case of the environment sensors 7A and 7B measuring the dust concentration, the ventilation execution determiner 146 determines that it is not appropriate to conduct the ventilation when the measurement taken by the environment sensor 7B is higher than the measurement taken by the environment sensor 7A, namely when the outdoor dust concentration is higher than the dust concentration in the living space.

If it is appropriate to conduct the ventilation, the ventilation execution determiner 146 activates the wind pressure data acquirer 140. Consequently, the wind pressure data acquirer 140 acquires wind pressure data, the wind direction determiner 141 determines the outdoor wind direction, and then the ventilation fan controller 142 controls the ventilation fan 2. On the other hand, if it is not appropriate to conduct the ventilation, the ventilation execution determiner 146 sets the first timer 143 to a predetermined time (for example, two hours) and activates the first timer 143 without activating the wind pressure data acquirer 140. Consequently, the ventilation control processing becomes on standby until the first timer 143 has called a timeout.

Figure 10:
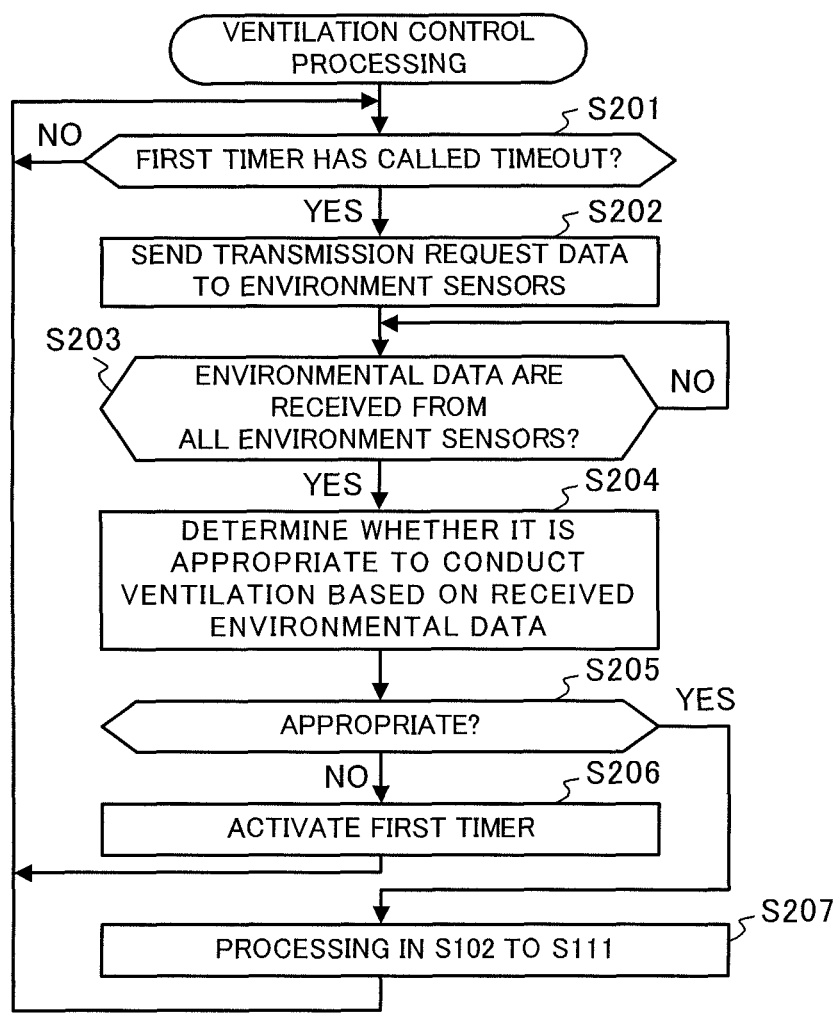
FIG. 10 is a flowchart showing a proceeding of a ventilation control processing according to Embodiment 3.

FIG. 10 is a flowchart showing a proceeding of the ventilation control processing executed by the controller 14 of the ventilation control device 1 of Embodiment 3. This ventilation control processing is repeatedly executed while the ventilation control device 1 is in the power-on state as in Embodiment 1.

The environmental data acquirer 145 determines whether the first timer 143 has called a timeout (Step S201). If the first timer 143 has called a timeout (Step S201; YES), the environmental data acquirer 145 sends data requesting for transmission of the measurement results (transmission request data) to the environment sensors 7A and 7B via the communicator 10 (Step S202). Receiving the transmission request data, the environment sensors 7A and 7B each transmit environmental data in which the measurement results are stored to the ventilation control device 1.

As the communicator 10 receives the environmental data transmitted from the environment sensors 7A and 7B (Step S203; YES), the ventilation execution determiner 146 determines whether it is appropriate to conduct the ventilation based on the measurement results (for example, measurements of humidity, dust concentration, or the like) contained in the environmental data of the environment sensors 7A and 7B as described above (Step S204). As a result, if it is not appropriate (Step S205; NO), the ventilation execution determiner 146 sets the first timer 143 to a predetermined time (for example, two hours) and activates the first timer 143 (Step S206). From then on, the controller 14 returns to the processing in the Step S201.

On the other hand, if it is appropriate to conduct the ventilation (Step S205; YES), the ventilation execution determiner 146 activates the wind pressure data acquirer 140. From then on, the controller 14 executes the same processing as in the Steps S102 to S111 in the ventilation control processing of Embodiment 1 (see FIG. 4).

As described above, the ventilation system according to Embodiment 3 of the present invention can realize efficient ventilation as the ventilation system of Embodiment 1. Furthermore, the ventilation system of Embodiment 3 does not execute the ventilation control when the outdoor air condition is poor such as high outdoor humidity or high outdoor dust concentration, preventing the poor outdoor air from entering the living space.

Here, the ventilation control device 1 and ventilation fan 2, the ventilation control device 1 and wind pressure sensors 3A and 3B, and the ventilation control device 1 and environment sensors 7A and 7B may be connected by separate, dedicated communication lines, respectively, instead of the home network 4.

The present invention is not confined to the above embodiments and various modifications can be made without departing from the gist of the present invention.

For example, the ventilation control device 1 may be connected to an external network such as the Internet so as to acquire information regarding the outdoor wind such as the wind direction from an external source.

Furthermore, the ventilation control system according to the above embodiments may be integrated into a HEMS (home energy management system), In such a case, the controller of the HEMS is configured to take in the function of the ventilation control device 1 according to the above embodiments.

Furthermore, the present invention is applicable not only to ventilation of an ordinary family house but also to ventilation of a factory, office building, or the like.

Furthermore, in the above embodiments, it is possible to apply the programs executed by the ventilation control device 1 to an existing personal computer (PC), a terminal device, or the like so as to make the PC, the terminal device, or the like function as the ventilation control device according to the present invention.

Such programs can be distributed by any method and, for example, stored and distributed on a computer-readable recording medium such as a CD-ROM (compact disk read-only memory), DVD (digital versatile disk), MO (magnetooptical disk), and memory card, or distributed via a communication network such as the Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A ventilation system for ventilating a building, comprising:
    an air supplier/exhauster comprising air supply function and exhaust function; and
    a ventilation control device controlling operation of the air supplier/exhauster, wherein upon operating the air supplier/exhauster, the ventilation control device determines which operation the air supplier/exhauster conducts, an air supply operation to bring outdoor air into the building, or an exhaust operation to exhaust air in the building to outside of the building, based on wind information regarding the outdoor wind, and the ventilation through a ventilation passage from the air supplier/exhauster to a vent provided to the building is conducted when the air supplier/exhauster conducts the air supply operation, and alternatively the ventilation through the ventilation passage from the vent to the air supplier/exhauster is conducted when the air supplier/exhauster conducts the exhaust operation, and wherein the ventilation control device determines whether the installation point of the air supplier/exhauster is windward or leeward based on the wind information, and orders the air supplier/exhauster to conduct the air supply operation if the air supplier/exhauster is windward and orders the air supplier/exhauster to conduct the exhaust operation if the air supplier/exhauster is leeward.

2. The ventilation system according to claim 1, further comprising:

a wind information measurer measuring information regarding the outdoor wind, wherein the ventilation control device uses the measurement results of the wind information measurer as the wind information.

3. The ventilation system according to claim 2, wherein the wind information measurer includes two separate wind pressure sensors each measuring a wind pressure of the outdoor air, wherein the ventilation control device determines whether the installation point of the air supplier/exhauster is windward or leeward by comparing the wind pressure measured by each of the two wind pressure sensors.

4. The ventilation system according to claim 2, wherein the wind information measurer comprises a wind direction sensor that measures a direction of the wind, and the ventilation control device determines whether the installation point of the air supplier/exhauster is windward or leeward based on the measurement results of the wind direction sensor, a direction of the installation point of the air supplier/exhauster, and a direction of the place where the vent is provided.

5. The ventilation system according to claim 1, further comprising:

a first environment sensor measuring a predetermined physical quantity representing the air condition in the building; and a second environment sensor measuring a predetermined physical quantity representing the condition of the outdoor air, wherein the ventilation control device determines whether it is appropriate to conduct the ventilation based on the respective measurement results of the first and second environment sensors and if it is appropriate, operates the air supplier/exhauster.

6. The ventilation system according to claim 1, wherein the ventilation control device adjusts at least one of a performance or an operation time of the air supplier/exhauster in accordance with a force of the outdoor wind.

7. A ventilation method, comprising:

acquiring wind information regarding the outdoor wind;

ordering an air supplier/exhauster comprising air supply function and exhaust function to conduct one of two operations, an air supply operation to bring outdoor air into a building or an exhaust operation to exhaust air in the building to outside of the building, based on the acquired wind information for ventilating the building;

determining whether the air supplier/exhauster is situated windward or leeward;

conducting the ventilation through a ventilation passage from the air supplier/exhauster to a vent provided to the building when the air supplier/exhauster conducts the air supply operation, and alternatively conducting the ventilation through the ventilation passage from the vent to the air supplier/exhauster when the air supplier/exhauster conducts the exhaust operation, and further comprising:

ordering the air supplier/exhauster to conduct the air supply operation when the air supplier/exhauster is situated windward, and alternatively ordering the air supplier/exhauster to conduct the exhaust operation when the air supplier/exhauster is situated leeward.

8. The ventilation method according to claim 7, further comprising:

adjusting at least one of a performance or an operation time of the air supplier/exhauster in accordance with a force of the outdoor wind.

9. A ventilation control device controlling ventilation of a building, comprising:

a wind information acquirer acquiring wind information regarding the outdoor wind; and an air supply/exhaust controller controlling operation of an air supplier/exhauster comprising air supply function and exhaust function, wherein upon operating the air supplier/exhauster, the air supply/exhaust controller determines which the air supplier/exhauster conducts, an air supply operation to bring outdoor air into the building or an exhaust operation to exhaust air in the building to outside of the building, based on the wind information acquired by the wind information acquirer, and determines whether the air supplier/exhauster is situated windward or leeward;

the ventilation through a ventilation passage from the air supplier/exhauster to a vent provided to the building is conducted when the air supplier/exhauster conducts the air supply operation, and alternatively the ventilation through the ventilation passage from the vent to the air supplier/exhauster is conducted when the air supplier/exhauster conducts the exhaust operation, and wherein the air supply/exhaust controller orders the air supplier/exhauster to conduct the air supply operation when the air supplier/exhauster is situated windward, and alternatively orders the air supplier/exhauster to conduct the exhaust operation when the air supplier/exhauster is situated leeward.

10. The ventilation control device according to claim 9, wherein the air supply/exhaust controller adjusts at least one of a performance or an operation time of the air supplier/exhauster in accordance with a force of the outdoor wind.

11. A non-transitory computer-readable recording medium having stored thereof a program allowing a computer controlling ventilation of a building to function as:

a wind information acquirer acquiring wind information regarding the outdoor wind; and an air supply/exhaust controller controlling operation of an air supplier/exhauster comprising air supply function and exhaust function, wherein upon operating the air supplier/exhauster, the air supply/exhaust controller determines which operation the air supplier/exhauster conducts, an air supply operation to bring outdoor air into the building or an exhaust operation to exhaust air in the building to outside of the building, based on the wind information acquired by the wind information acquirer, the ventilation through a ventilation passage from the air supplier/exhauster to a vent provided in the building is conducted when the air supplier/exhauster conducts the air supply operation, and alternatively the ventilation through the ventilation passage from the vent to the air supplier/exhauster is conducted when the air supplier/exhauster conducts the exhaust operation, and wherein the air supply/exhaust controller orders the air supplier/exhauster to conduct the air supply operation when the air supplier/exhauster is situated windward, and alternatively orders the air supplier/exhauster to conduct the exhaust operation when the air supplier/exhauster is situated leeward.

12. The non-transitory computer-readable recording medium according to claim 11, wherein the air supply/exhaust controller adjusts at least one of a performance or an operation time of the air supplier/exhauster in accordance with a force of the outdoor wind.

* * * * *